Feb. 12, 1957 W. L. MORGAN ET AL 2,781,282
METHOD AND APPARATUS FOR MASKING SUPPORT BODIES
Filed Sept. 21, 1953 4 Sheets-Sheet 3
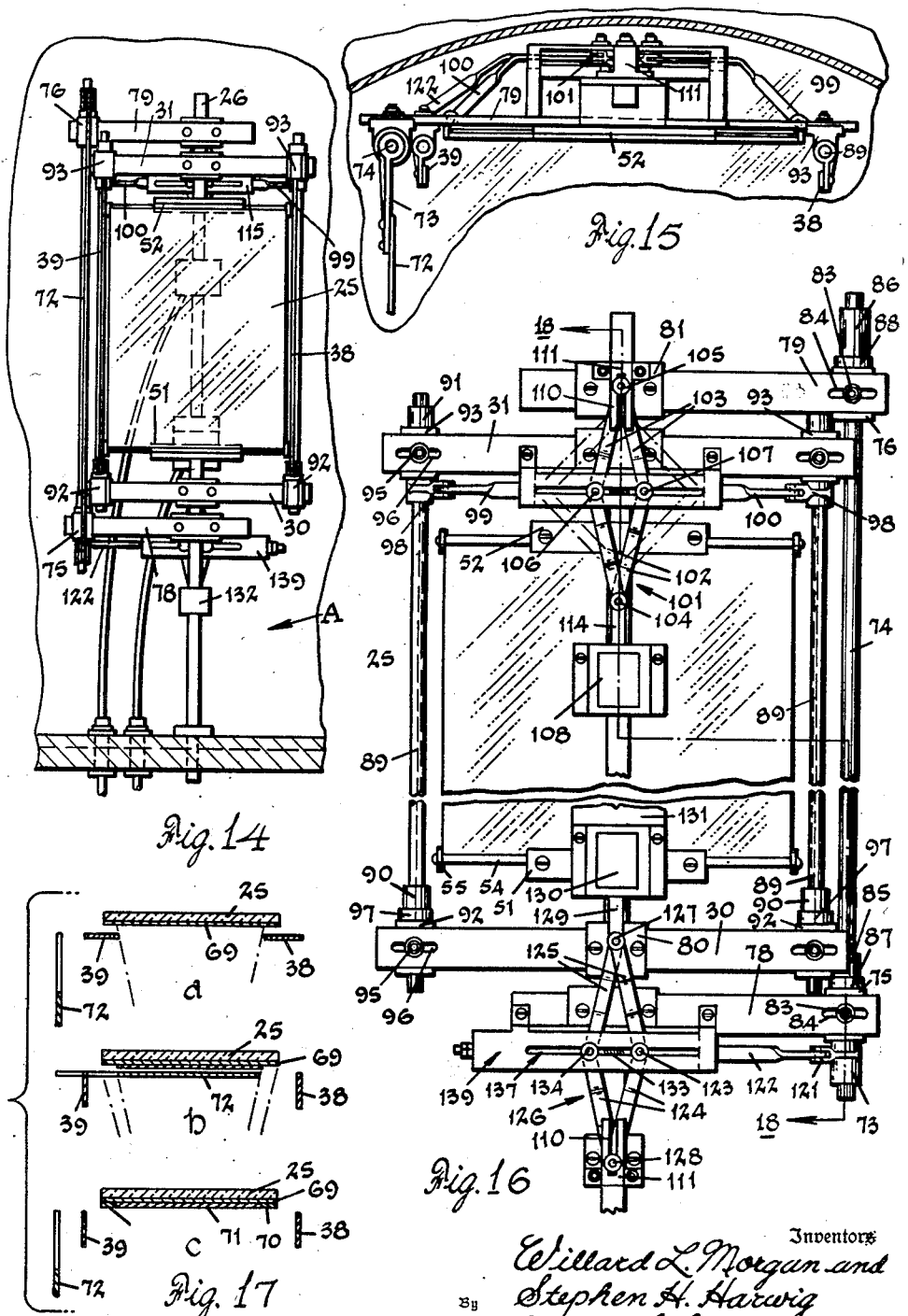
Inventors
Willard L. Morgan and
Stephen H. Harwig
By Hobbe & Swope
Attorneys

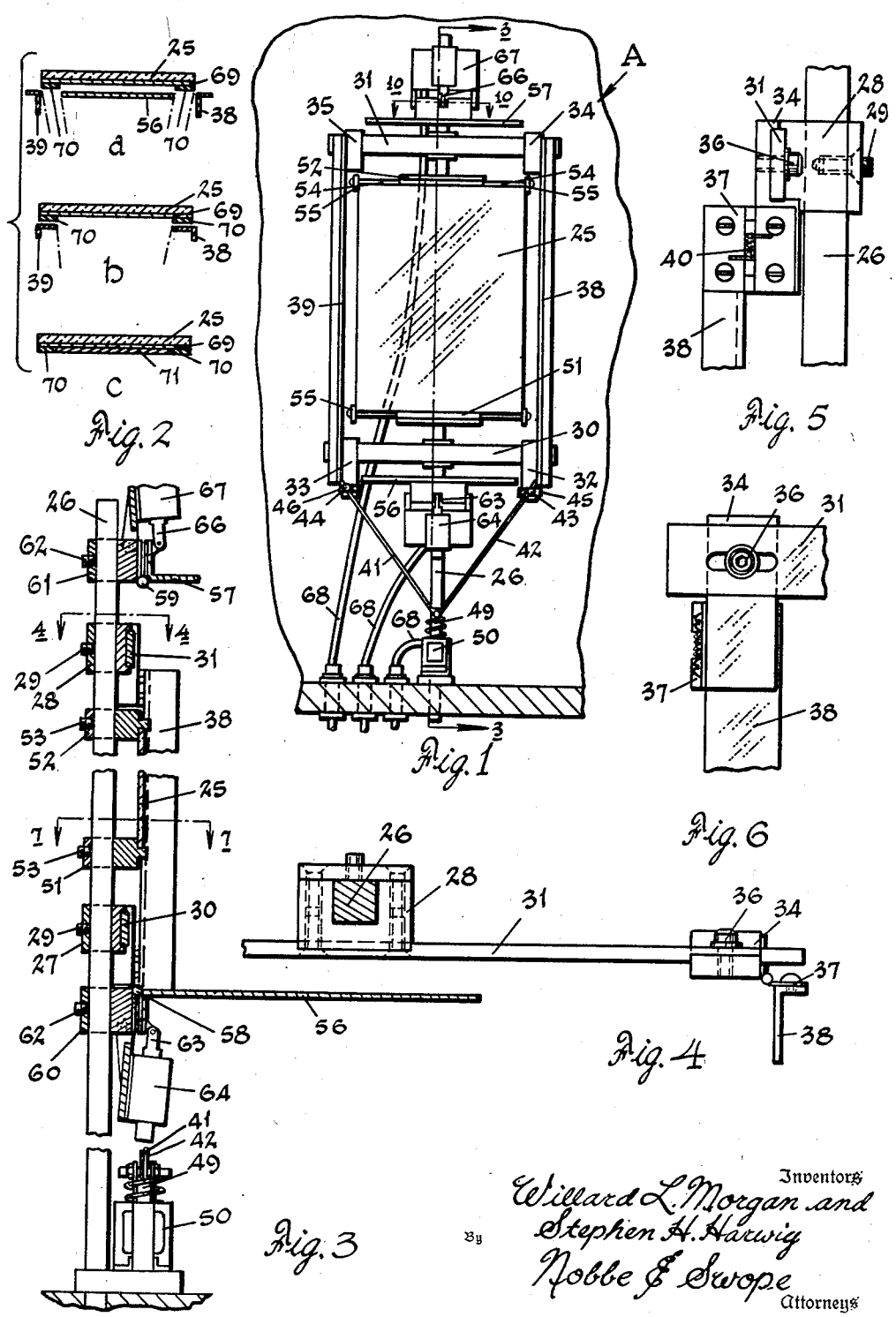

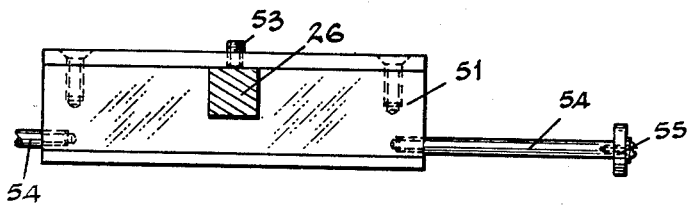
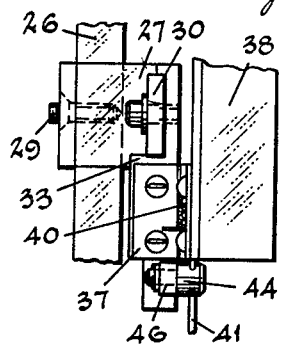
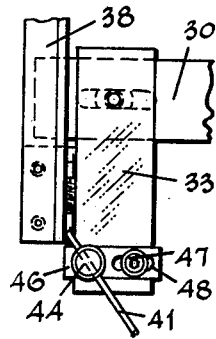
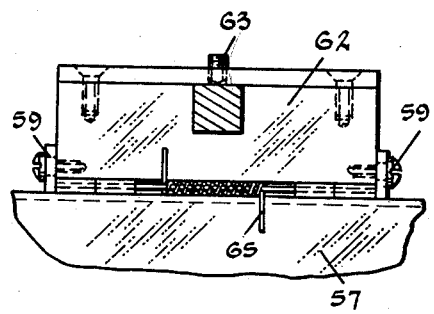
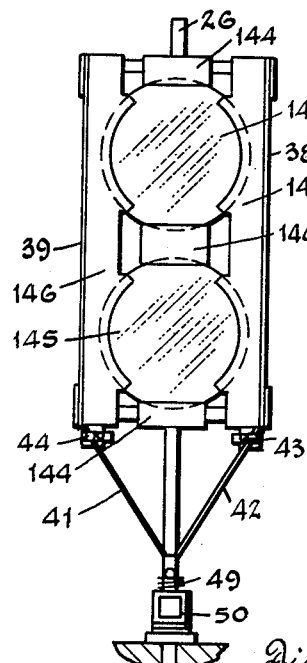
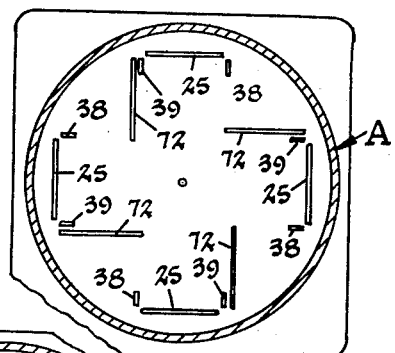
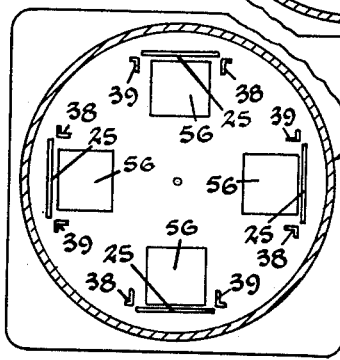

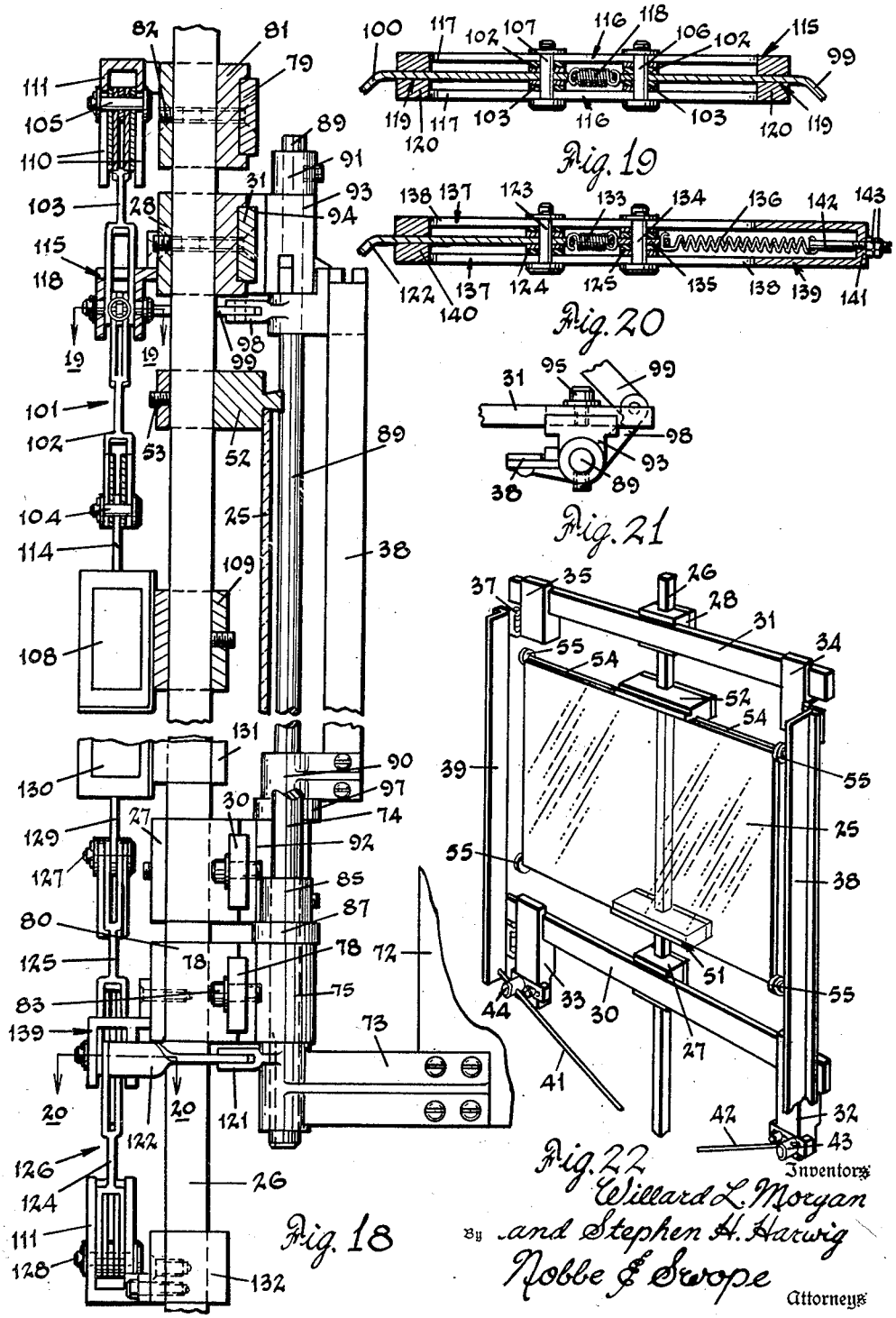

United States Patent Office 2,781,282
Patented Feb. 12, 1957

2,781,282

METHOD AND APPARATUS FOR MASKING SUPPORT BODIES

Willard L. Morgan, Pittsburgh, and Stephen H. Harwig, Edgewood, Pa., assignors to Libbey-Owens-Ford Glass Company, Toledo, Ohio, a corporation of Ohio Application September 21, 1953, Serial No. 381,368

14 Claims. (Cl. 117—212)

This invention relates broadly to the thermal evaporation in a high vacuum of films or coatings upon support bodies such as sheets of vitreous siliceous material and more particularly to an improved method and apparatus for masking certain portions of a support body to which a plurality of different films or coatings are to be successively applied.

While the present invention is not limited to any specific use, it finds particular utility in the fabrication of the improved type of light transmissive electrically conductive article described in copending application Serial No. 366,192, filed July 6, 1953.

The electrically conductive article disclosed in said application consists generally of a support body comprising a sheet of glass or other siliceous material to one surface of which is applied a thin transparent electrically conductive film of metal which may, for example, be gold, silver, copper, iron or nickel. There is then applied along two opposite spaced edge portions of the metal film, electrode strips or bus bars for conducting electric current to the electrically conductive film. Finally, a hard transparent protective layer of dielectric inorganic material is applied to the electrically conductive coating between the spaced electrodes. The electrically conductive film, electrodes, and protective layer are adapted to be separately and successively applied to the support body, and it is preferred that they be deposited upon said support body by direct thermal evaporation within a vacuum of small amounts of the materials making up said films or coatings.

In applying the successive coatings or films to the support body, it will be evident that those portions of the support body which are not to be coated must be shielded or masked so that only the desired area is coated. Such masking operations do not readily lend themselves to application in a vacuum chamber. In the past, it has been customary to remove the object being coated from the vacuum chamber and mask or shield the desired portion or portions thereof after each application of material so that it may again be placed in the chamber to be coated with another type material. As a result, dust and dirt often enter the vacuum chamber and adversely affect the characteristics of the film or coating deposited upon the support body as well as the adhesion between the material and the support body or between the different coatings. Further, this excessive handling of the support body materially increases the liability of scratching or marring the surfaces thereof.

It is therefore the primary object of this invention to provide an improved method and apparatus for depositing successive films or coatings of different materials upon a support body arranged within a vacuum chamber and during a single thermal evaporation process.

Another object of the invention is the provision of a method and apparatus in which predetermined selected portions of a support body are shielded or masked during the evaporation of different materials by the employment of a plurality of adjustable shields which are controlled from exteriorly of the vacuum chamber so that it is not necessary to open the chamber between the application of successive films or coatings.

Another object of the invention is to provide a method and apparatus for masking or shielding various portions of the support body so as to allow a series of different coatings to be applied to predetermined selected portions of the support body without the necessity of removing said support body from the vacuum chamber.

Other objects and advantages of the invention will become more apparent during the course of the following description when taken in connection with the accompanying drawings.

In the accompanying drawings, wherein like numerals are employed to designate like parts throughout the same:

Fig. 1 is a front elevation of masking or shielding means constructed in accordance with the invention and confined within a vacuum chamber;

Fig. 2 is a diagrammatic view showing a particular sequence that might be used in applying various coatings to a support body;

Fig. 3 is a vertical sectional view taken substantially on line 3—3 of Fig. 1;

Fig. 4 is a horizontal detail view taken substantially on line 4—4 of Fig. 3 and illustrates, in plan, a mounting member for one of the side masking shields;

Fig. 5 is an end view of the mounting member shown in Fig. 4;

Fig. 6 is a rear surface view of the mounting member;

Fig. 7 is a horizontal detail view of one of the glass sheet supporting members and as taken substantially on line 7—7 of Fig. 3;

Fig. 8 is an end elevation of the second mounting member for the side masking shields;

Fig. 9 is a front elevation of the mounting member shown in Fig. 8;

Fig. 10 is a horizontal detail view as taken substantially on line 10—10 of Fig. 1 and illustrates a plan of one of the central masking shields;

Fig. 11 is a top diagrammatic view showing a modified embodiment of the invention in a vacuum chamber;

Fig. 12 is a front elevation of a modified embodiment of the shielding means constructed in accordance with the invention;

Fig. 13 is a top diagrammatic view of a further embodiment of the invention within a vacuum chamber;

Fig. 14 is a front elevation of another embodiment of the invention illustrating a modification of the shielding means;

Fig. 15 is a plan view of the apparatus shown in Fig. 14;

Fig. 16 is a rear view of the apparatus of Fig. 14;

Fig. 17 is a diagrammatic view depicting a sequence that might be used in shielding various portions of a support body;

Fig. 18 is a vertical sectional view taken substantially on line 18—18 of Fig. 16;

Fig. 19 is a partial horizontal sectional view taken substantially on line 19—19 of Fig. 18;

Fig. 20 is a detail horizontal sectional view taken substantially on line 20—20 of Fig. 18;

Fig. 21 is a fragmentary detail top plan view of Fig. 14; and

Fig. 22 is a perspective view showing another type of shielding means constructed in accordance with the invention.

Referring now to the drawings and particularly to that form of the invention shown in Figs. 1 to 11, the numeral 25 denotes a support body comprising a sheet of glass or other siliceous material to be coated and which is supported on edge by a vertical post 26 supported from the bottom wall of the vacuum chamber "A."

Slidably mounted upon the vertical post 26 are vertically spaced blocks 27 and 28 which are secured in desired position by set screws 29 and carry the horizontal cross bars 30 and 31 respectively. Slidably mounted on the cross bar 30, at opposite ends thereof, are brackets 32 and 33 while similar brackets 34 and 35 are slidable upon the cross bar 31, each of said brackets being adjustably secured in place by means of a clamping screw 36 shown in Fig. 4.

Attached to the brackets 32 and 34 by double-leaf hinges 37 is a vertical side shield or masking member 38, while a second side shield or masking member 39 is similarly hinged to the brackets 33 and 35. Each of the shields 38 and 39 is normally urged into masking position by a coil spring 40 carried by the hinge pintle and acting on the component leaves of the hinge. The shields 38 and 39 are relatively narrow and are held in open or non-masking position by means of slide rods 41 and 42 are shown in Fig. 9. The rods 41 and 42 are slidably mounted in studs 43 and 44 rotatably carried by plates 45 and 46 located in notched portions formed in the brackets 32 and 33 and secured on adjusted position by a screw 47 passing through slot 48 and threaded within the brackets 32 or 33. The rods 41 and 42 are slidable through the studs 43 and 44 and the upper ends thereof, which project beyond the studs, engage the shields 38 and 39 to hold the same in open position. The rods 41 and 42 are operably connected at their lower ends to the armature 49 of a solenoid 50 which when actuated, retracts the rods 41 and 42 from their normal position of holding the masking members 38 and 39 in open position, and allows the springs 40 to swing the masking members to masking position where they overlap or cover the marginal edge portions of the glass sheet 25 as shown in Fig. 2(b).

The glass sheet 25 is held rigidly in a substantially vertical position by a lower notched block 51 and an upper notched block 52 both of which are slidably mounted on the supporting post 26 and engage the lower and upper edges of the glass sheet respectively. The blocks are adjustably secured to the post by set-screws 53. Projecting laterally from opposite ends of the notched blocks 51 and 52 are rods 54 (Fig. 7) which have adjustable end washers 55 movable so as to grip the opposite vertical side edges of the glass sheet 25. Thus, sheets of varying width and length may be accommodated. However, it is contemplated that modifications of the support body mounting means may be used to support various other shapes and the invention is not restricted to coating rectangular sheets only. And, although the support body has been shown in a vertical position, the apparatus obviously can be operated in a horizontal plane.

In addition to the side shields 38 and 39, the embodiment shown in Figs. 1 to 11 embodies horizontally pivoted center shields 56 and 57 which are movable into the path of the coating material to shield the center of the glass sheet 25 from the material which is being deposited along the edges of the sheet. The shields 56 and 57 are pivotally mounted by horizontal pins 58 and 59 to the vertically adjustable blocks 60 and 61 slidable on post 26 and held by set-screws 62. Connected to the lower shield 56 is the armature 63 of a normally deenergized expulsion type solenoid 64 which, when energized, causes the shield 56 to pivot upwardly to shield the lower central portion of the sheet or support body 25. The upper shielding member 57 normally is held in its upward inoperative position against the bias of a coil spring 65, shown in Fig. 10, by the armature 66 of normally energized solenoid 67. In moving member 57 to masking position, solenoid 67 is deenergized and spring 65 together with the weight of the shield 57, causes the said shield to swing downwardly to mask the upper central portion of the sheet.

The actual operation of the respective solenoids and masking members is effected by means of switches (not shown) attached to power leads 68 outside of the confines of the evaporation chamber "A." Thus, it will be seen that either the marginal masking members 38 and 39, or the central masking members 56 and 57 or any combination of them may be actuated independently to obtain the desired masking configuration.

Referring particularly to Fig. 2(c), it will be noted that there has been applied to the support body 25 the three coatings 69, 70 and 71. The coating 69 may be a thin electrically conductive film of metal such as gold, silver, copper, iron or nickel, while the coatings 70 are electrically conductive films in the form of bus bars or electrodes preferably of copper or silver applied to the coating 69 along the marginal edge portions of the support body 25 so as to conduct current to and from the coating 69. Since electrically conductive films of gold, silver, copper, iron or nickel are generally rather soft and easily scratched, a protective film 71 is then applied over the exposed portion of the film 69 to protect it from marring or abrasion and also to act in some cases as an insulating material.

In applying the coatings, the entire surface of the support body or glass sheet is first coated with the conductive films 69, at which time all of the masking members or shields 38, 39, 56 and 57 are in inoperative or non-masking position. Then, as shown in Fig. 2(a) the central masking members 56 and 57 are moved into masking position so as to cover the central portion of the sheet. At the same time, the edge or marginal masking members 38 and 39 are maintained in non-masking position to allow the opposite marginal edge portions of the sheet to be coated as at 70 to form the electrodes of bus bars. Subsequently, as shown in Fig. 2(b) the center masking members 56 and 57 are removed from masking position in front of the sheet to allow the protective film 71 to be deposited on the central area of the sheet while, at the same time, the side shields 38 and 39 are swung into masking position to shield the coatings 70 previously applied to the film 69. Fig. 2(c) shows the glass sheet after all of the coatings have been applied.

From the above, it will be seen that three different coatings or films have been applied to the support body, the first being a uniform coating 69 over the entire surface of the sheet 25, no part of which was masked or shielded, the second coating 70 along the opposite marginal edges of the sheet, and the third coating 62 covering the coating 69. While Fig. 2 shows only the central portion of the electrically conductive film being coated with a protective film, it is desirable in some cases to coat the entire support body with the protective film 71 so that the entire surface may be protected from scratches or insulated from foreign materials.

Another embodiment of the invention is illustrated in Figs. 13 to 21. Instead of using horizontally mounted central masking members 56 and 57, this form of the invention utilizes a single vertically mounted central masking member 72 attached by means of brackets 73 to a vertical shaft 74 axially supported in sleeved mounting blocks 75 and 76 which are similarly provided in their rear surfaces with notches for receiving the horizontal cross arms 78 and 79. These cross arms are supported on the post 26 by means of blocks 80 and 81 secured on the post by set-screws 82 and the members 75 and 76 arranged at the outer end of the cross arms, are secured thereon by set-screws 83 passing through slots 84 in the cross arms 78 and 79. The shaft 74 is supported for frictionally-free pivotal movements by means of collars 85 and 86 secured to the shaft and mounted on bearings 87 and 88 which in turn are carried by the mounting members 75 and 76 (Fig. 16).

In this form of apparatus, the side or marginal masking member 38 is mounted on a vertical shaft 89 provided with collars 90 and 91 and journaled in sleeved mounting members 92 and 93 provided with notches 94 by which said members are mounted on horizontal cross bars 30 and 31 and adjustably secured thereon by set-screws 95 passing through slots 96 in the cross-arms. The collar 90 is pivotally carred by a bearing 97 supported on the lowermost member 92. The other marginal masking member 39 is likewise mounted on a second vertical shaft 89 journaled in corresponding mounting members 92 and 93 that are adjustably mounted at the opposite end of the cross bars 30 and 31 and thus secured by set-screws 95. The shafts 89 are thus vertically supported for pivotal movement on their associated bearings 97.

As best shown in Figs. 15 to 18, each vertical shaft 89 is provided with a crank 98 fixedly mounted thereon and located beneath the mounting members 93 and which are pivotally connected to the respective outer end of links 99 and 100. The opposite or inner ends of links 99 and 100 are attached to an expanding link or pantagraph mechanism and are generally designated by the numeral 101. This mechanism is formed of pairs of links 102 and 103 arranged as a parallelogram and interconnected at their end by studs 104, 105, 106 and 107; the stud 104 serving to join the pair of links 102, the stud 105 to join the pair of links 103 while the studs 106 and 107 interjoin the related links of each pair. The stud 104 further connects the mechanism 101 to an operative source, such as the solenoid 108, carried by block 109 on the post 26. The stud 105 is located in the slotted portions 110 of a bifurcated bracket 111 mounted on the block 81 secured on the post 26 by set-screw 82. The slots 110 are located in vertical alignment with the line of motion of the armature 114 of the solenoid 108 so that as the ends of the links 102, attached to the armature 114 by stud 104, are caused to be moved thereby, the stud 105 will carry the opposite end of links 103 in alignment therewith and within the vertically disposed confines of slots 110.

The studs 106 and 107, joining the related ends of links 102 and 103, are slidably carried by a bracket 115 fixedly secured to the cross arm 31 and more particularly in slots 116 in the walls 117 thereof. The slots 116 are located in a plane substantially normal or at right angles to the plane of alignment through the axes of studs 104 and 105. Thus upon actuation of the pair of links 102, as by the solenoid 108, the studs 106 and 107 will traverse a restricted path described by the slots 116 and the stud 105 will carry the opposite ends of links 103 within the slots 110. The studs 106 and 107 also connect the inner ends of links 99 and 100 to the associated ends of links 102 and 103 of mechanism 101. The opposed ends of links 99 and 100 are provided with openings for receiving the ends of a coiled tension spring 118 which is adapted to normally draw the studs 106 and 107 toward one another and the links 102 and 103 into a collapsed relation. As will be seen in Fig. 19, the links 99 and 100 are guided by slots 119 formed in the end wall 120 of the bracket 115 in order that the links when actuated by the pantagraph mechanism 101 will cause the cranks 98 to rotate their respective shafts 89 and thereby swing the marginal masking shields 38 and 39 into and out of their operative position with reference to the support body 25.

Accordingly when the armature 114 of solenoid 108 is actuated to move outwardly, the links 102, attached to the armature by stud 104, will move toward the position shown in phantom line in Fig. 16 thereby moving the studs 106 and 107 outwardly within the slots 116 of bracket 115 and against the tension of spring 118. The links 99 and 100 actuated to outward movement by the studs 106 and 107 will rotate the shafts 89 by means of cranks 98 to swing the masking shields 38 and 39 into their operative positions. When the links 102 are actuated by the armature 114, the related pair of links 103 operate as aligning members as the stud 105, interjoining them, traverses downwardly in the slots 110 of the bracket 111. Upon deenergization of the solenoid 108, the coil spring 118 is permitted to retract and return the component links of the mechanism 101 to the full line position (Fig. 16). Thus as the spring draws the links 102 and 103 inwardly, the studs 106 and 107 carried thereby act to move the links 99 and 100 to swing the cranks 98 and shafts 89 to return the shields 38 and 39 to their non-masking positions.

The construction of the actuating mechanism for the vertically mounted central masking member 72 is very similar to that of the side masking members in this embodiment. A crank member 121 is mounted, or may be formed as an integral part of bracket 73, on the lower end of the pivotal shaft 74, and a link 122 has one end pivotally connected to the crank 121 and its other end attached to stud 123 which interconnects the associated ends of pairs of links 124 and 125 of a pantagraph mechanism 126. This mechanism is of similar construction to the mechanism 101, previously described, and the pairs of links 124 and 125 are individually joined by studs 127 and 128.

The stud 127 connects the pair of links 125 to the armature 129 of a solenoid 130 mounted by a block 131 on the post 26 while the stud 128 joining the ends of links 124 is movably supported in the slots 110 of a second bifurcated bracket 111, mounted, in this instance, by a block 132 on the post. As previously set forth, the pair of links 124 and 125 are biased in one position, as shown in full line by means of a spring 133; however, as shown in Fig. 20, in order to compensate for the energy required to operate the central shield 72, the stud 134, opposite the stud 123 and likewise joining the related ends of links 124 and 125, also carries a plate 135 to which the spring 133 is connected on one side of stud 134 while on the opposite side one end of a spring 136 is attached.

The studs 123 and 134 are adapted to traverse the slots 137 formed in the side walls 138 of a bracket 139 mounted on cross-arm 78, through the end wall 140 of which the link 122 is guided. The opposite end wall 141 (Fig. 20) is adapted to support a threaded rod 142 which at one end is provided with an opening to receive the end of the spring 136 opposite the plate 135. By means of nuts 143, the rod 142 may be moved relative to the end wall 141 to adjust the tension of spring 136 and by thus acting on the links 124 and 125 through stud 134 balance the operation of the pantagraph mechanism 126 by compensating for the effective motion of the link 122 as created by movement of the stud 123.

In operation, the expulsion type solenoid 130 is energized causing armature 129 to move downwardly. Downward movement of the armature 129 causes the links 124 and 125, attached by studs 123 and 134 to spread outwardly thus moving the link 122 outwardly, which in turn causes the crank 121 to swing the central masking member 72 to masking position. In moving to masking position, the central masking member, which is offset from the shaft 74 by brackets 73, is swung around the side shield 39 and is completely free of any contact or connection with the side shield because of the offset relation afforded by brackets.

Referring now to Fig. 17, a diagrammatic sketch of a masking sequence using the vertically mounted central masking member in conjunction with the side or edge masking member is shown. The coating materials may be of the same type as described hereinabove in discussing the sequence used in Fig. 2. More particularly, Fig. 17(a) shows a support body 25 which has been initially coated with a conducting film 69 over its entire surface and now has side masking members 38 and 39 in masking position while the central portion of the sheet is being coated with a second type material 71 such as a protective or insulating material. Fig. 17(b) shows the side masking members in a non-masking position while the center masking member 72 has been pivoted past the side shield 39 to mask the central portion of the sheet so that electrode material 70 or the like may be placed on the marginal edges of the sheet. Fig. 17(c) shows the completely coated body member 25 with the three types of coating materials placed thereon and the shields 38, 39 and 72 in their non-masking positions.

In describing the coating sequences we have used three coating materials by way of illustration, but the scope of the invention is not limited to a specific number of coatings as it may be used to apply any number of coatings greater or less than the three used in illustration. Also, various modifications of the device and its masking members may be used. For example, as is shown in Fig. 12, the shielding members may be formed so as to shield a particular configuration. In this embodiment blocks 144 are mounted on the post 26 to support circular support bodies 145 and the shields 38 and 39 are equipped with special auxiliary shields 146 to mask the bodies 145 in arcuate areas. Or, on the other hand, other modifications may be utilized such as shown in Fig. 22 where only side masking members are used.

It is to be understood that the form of the invention disclosed herein is to be taken as the preferred embodiment thereof and that various changes in the shape, size and arrangement of parts may be resorted to without departing from the spirit of the invention or the scope of the following claims.

We claim:

1. In a device for placing material on a support body, the combination of a frame, a support body retaining member carried by said frame for supporting said support body rigidly in a substantially vertical position, a plurality of pivotally mounted masking members swingable on said frame and movable to obstruct the flow of material to portions of the support body, and a chamber enclosing said frame and support body.

2. In apparatus for use in the deposition of materials in a closed chamber upon a support body, means for supporting the support body to be coated in a substantially rigid position in the chamber, shielding means arranged within the chamber in proximity to said supporting means, and means for pivotally mounting said shielding means to swing to a position in front of the support body for masking predetermined portions thereof during deposition of materials within the chamber and to a second position outwardly of the edges of said support body.

3. In apparatus of the character defined in claim 2, in which the shielding means comprises a plurality of shields and means is provided operable from outside the chamber for selectively actuating said shields.

4. In apparatus for use in placing materials in a closed chamber upon a support body, rigid supporting means, a plurality of cross bars adjustably mounted on said supporting means, means mounted intermediate said cross bars for rigidly supporting the support body to be coated, masking means adjustably mounted on said bars, said masking means being operable to move into and out of a covering position relative to said support body, and actuating means operably connected to said masking means for moving said last named means.

5. In a device for depositing materials on a support body, the combination of a rigidly mounted holder, means attached to said holder for supporting said support body in a substantially vertical position, a plurality of sets of swingable masking means pivoted on said holder, said masking means being positioned so as to be swung into and out of the path of the material, actuating means for each set of masking means, and a chamber for enclosing said holder, masking means, and support body.

6. In a device for depositing materials on a support body, the combination of a rigidly supported frame, support body retaining means for rigidly mounting said support body, swingable masking members attached to said frame and located on opposite sides of said frame for shielding selected portions of said support body, actuating means operatively connected to said masking means to move them into shielding position, and means enclosing said frame, masking members and support body.

7. In apparatus for use in depositing materials in a closed chamber upon a support body, a frame, support body retaining means attached to said frame, a plurality of swingable masking members having parallel axis carried by said frame, at least one of said swingable members being connected to be moved independently of the others to mask a portion of said support body, and actuating means for each of said masking members to move said masking members into and out of masking position.

8. In apparatus for use in depositing materials in a closed chamber upon a support body, a vertical supporting post, a lower substantially horizontal cross bar slidably mounted intermediate the ends of said supporting post, an upper cross bar slidably mounted on said supporting post above said lower cross bar, spaced means for supporting said support body mounted on said post intermediate said upper and lower cross bars, pivotally mounted masking means adjustably mounted on said cross bars, said masking means being swingable so as to shield a portion of said support body, actuating means operably connected to said pivotally mounted masking means, and a vacuum chamber member enclosing all of said parts.

9. In apparatus for use in depositing materials in a closed chamber upon a support body, a frame, said frame having support body retaining means mounted thereon and masking means pivotally attached thereto, said masking means being swingable into masking position in front of said body and adapted to shield an arcuate portion of said support body.

10. The method of applying a plurality of coatings to a support body, comprising the steps of applying a first coating to the body, masking the central portion of the body, applying a second coating to opposite marginal edge portions of the body, unmasking the central portion of the body and masking the coated marginal edge portions thereof, and applying a third coating to the central portion of the body.

11. The method of coating sheets with a thermal evaporable material, comprising the steps of placing the sheets in an upright position in a thermal evaporation chamber, coating the sheets with a thermal evaporable material, moving masking members along opposite marginal edges of the sheets, and coating the said edges with a second type of thermal evaporable material.

12. In the method of applying a plurality of coatings to a support body, the steps of applying an electrically conductive coating material to the body, shielding a portion of the electrically conductive coating and applying a second electrically conductive coating to the exposed parts of the first named coating, shielding the second coating, and coating the initially shielded electrically conductive coating with a protective coating.

13. The method of coating sheets with a plurality of thermal evaporable materials under the same vacuum condition, comprising the steps of placing the sheets in a substantially upright position in a thermal evaporation chamber, coating the sheets with an electrically conductive material, masking a portion of the first coating, and coating the unmasked portions of the sheets with a second electrically conductive thermal evaporable material.

14. The method of applying a plurality of materials to a support body, comprising the steps of applying a first coating over the entire surface of the body, masking the central portion of the body while leaving the marginal edge portions of the body unmasked, applying a second coating to the marginal unmasked portions of the body, removing the central masking means, and applying a third coating to the entire sheet covering the exposed portions of the said first and second coatings.

(References on following page)

References Cited in the file of this patent

UNITED STATES PATENTS

| | | |
|---|---|---|
| 2,151,457 | Williams | Mar. 21, 1939 |
| 2,189,580 | Hewlett | Feb. 6, 1940 |
| 2,273,941 | Dorn | Feb. 24, 1942 |
| 2,453,582 | Morgan | Nov. 9, 1948 |
| 2,463,906 | Pride | Mar. 8, 1949 |
| 2,614,524 | Haynes | Oct. 21, 1952 |
| 2,629,757 | McKay | Feb. 24, 1953 |
| 2,633,427 | Dimmick et al. | Mar. 31, 1953 |
| 2,675,740 | Barkley | Apr. 30, 1954 |